United States Patent
Lu et al.

(10) Patent No.: US 7,990,979 B2
(45) Date of Patent: Aug. 2, 2011

(54) RECURSIVELY PARTITIONED STATIC IP ROUTER TABLES

(75) Inventors: Wencheng Lu, Sunnyvale, CA (US); Sartaj Kumar Sahni, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 274 days.

(21) Appl. No.: 12/377,032

(22) PCT Filed: Aug. 24, 2007

(86) PCT No.: PCT/US2007/076756
§ 371 (c)(1),
(2), (4) Date: Mar. 5, 2009

(87) PCT Pub. No.: WO2008/024971
PCT Pub. Date: Feb. 28, 2008

(65) Prior Publication Data
US 2010/0135305 A1 Jun. 3, 2010

Related U.S. Application Data

(60) Provisional application No. 60/840,092, filed on Aug. 25, 2006.

(51) Int. Cl.
*H04L 12/28* (2006.01)
(52) U.S. Cl. .................. 370/395.32; 370/408
(58) Field of Classification Search ............. None
See application file for complete search history.

(56) References Cited

U.S. PATENT DOCUMENTS

| 6,011,795 | A  | * | 1/2000  | Varghese et al. ............. 370/392 |
| 6,018,524 | A  |   | 1/2000  | Turner et al. |
| 6,563,823 | B1 |   | 5/2003  | Przygienda et al. |
| 6,614,789 | B1 |   | 9/2003  | Yazdani et al. |
| 6,658,482 | B1 |   | 12/2003 | Chen et al. |
| 6,798,777 | B1 |   | 9/2004  | Ferguson et al. |
| 6,859,455 | B1 |   | 2/2005  | Yazdani et al. |
| 6,867,991 | B1 |   | 3/2005  | Tezcan et al. |
| 6,975,631 | B1 |   | 12/2005 | Kastenholz |
| 7,430,560 | B1 | * | 9/2008  | Mittal .................................. 1/1 |
| 7,478,109 | B1 | * | 1/2009  | Panigrahy et al. .................... 1/1 |

(Continued)

FOREIGN PATENT DOCUMENTS

WO  WO 99/26163  5/1999

(Continued)

OTHER PUBLICATIONS

Srinivasan et al. "Fast Address Lookups Using Controlled Prefix Expansion" Feb. 1999.*

(Continued)

*Primary Examiner* — Chirag Shah
*Assistant Examiner* — Jenkey Van
(74) *Attorney, Agent, or Firm* — Saliwanchik, Lloyd & Eisenschenk

(57) ABSTRACT

A recursively partitioned static router-table, the data structure incorporating a first-level partition including subtries and an auxiliary trie. A node of the subtrie includes a path Q(N) from the root R of a trie T to a root N of the subtrie, a stride s for a next-level partition, a mask that characterizes a next-level perfect hash function, and a pointer to the hash table for the next-level partition. At least one of the trie T, the first-level partition, the auxiliary trie, and the next-level partition is represented by a base structure selected from the group consisting of MBT and HSST.

19 Claims, 8 Drawing Sheets

U.S. PATENT DOCUMENTS

| | | | |
|---|---|---|---|
| 2004/0111440 A1* | 6/2004 | Richardson et al. | 707/200 |
| 2004/0141509 A1* | 7/2004 | Sahni et al. | 370/401 |
| 2004/0230696 A1* | 11/2004 | Barach et al. | 709/238 |
| 2004/0258061 A1* | 12/2004 | Sahni et al. | 370/389 |
| 2005/0157712 A1* | 7/2005 | Rangarajan et al. | 370/388 |
| 2006/0020638 A1* | 1/2006 | Shadmon | 707/200 |
| 2007/0067201 A1* | 3/2007 | Malewicz | 705/9 |
| 2007/0121632 A1* | 5/2007 | Zabarski | 370/392 |

FOREIGN PATENT DOCUMENTS

WO    WO 03/063427 A1    7/2003

OTHER PUBLICATIONS

Tzeng, N.-F., "Routing Table Partitioning for Speedy Packet Lookups in Scalable Routers", IEEE Transactions on Parallel and Distributed Systems, May 2006, vol. 17, No. 5, pp. 481-494.

Pao, D., Liu, C., Wu, L., and Chan, K.S., "Efficient Hardware Architecture for Fast IP Address Lookup", IEE Proceedings, Computers and Digital Techniques, Jan. 2003, vol. 150, No. 1, pp. 43-52.

Degermark, M., Brodnik, A., Carlsson, S., and Pink., S., "Small Forwarding Fables for Fast Fouting Lookups", Proceedings of SIGCOMM, 1997, pp. 3-14.

Eatherton, W., Varghese, G., and Dittia, Z., "Tree Bitmap: Hardware/Software IP Lookups with Incremental Updates", ACM SIGCOMM Computer Communication Review, Apr. 2004, vol. 34, No. 2, pp. 97-122.

Lampson, B., Srinivasan, V., and Varghese, G., "IP Lookups Using Multiway and Multicolumn Search", INFOCOM '98. Seventeenth Annual Joint Conference of the IEEE Computer and Communications Societies. Proceedings. IEEE, Mar. 29-Apr. 2, 1998, vol. 3, pp. 1248-1256.

Lu, H., Kim, K.S., and Sahni, S., "Prefix and Interval-Partitioned Dynamic IP Router-Tables", IEEE Transaction on Computers, May 2005, vol. 54, No. 5, pp. 545-557.

Van Lunteren, J., "Searching Very Large Routing Tables in Fast SRAM", IEEE Tenth International Conference on Computer Communications and Networks, Proceedings, 2001, pp. 4-11.

Van Lunteren, J., "Searching Very Large Routing Tables in Wide Embedded Memory", IEEE Global Telecommunications Conference, GLOBECOM, 2001, vol. 3, pp. 1615-1619.

Nilsson, S. and Karlsson, G., "Fast Address Lookup for Internet Routers", IEEE Broadband Communications, 1998.

Ruiz-Sanchez, M.A., Biersack, E.W., and Dabbous, W., "Survey and Taxonomy of IP Address Lookup Algorithms", IEEE Network, Mar./Apr. 2001, pp. 8-23.

Sahni, S., and Kim, K.S., "Efficient Construction of Multibit Tries for IP Lookup", IEEE/ACM Transactions on Networking, Aug. 2003, vol. 11, No. 4, pp. 650-662.

Sahni, S., Kim, K.S., and Lu, H., "Data Structures for One-Dimensional Packet Classification Using Most-Specific-rule Matching", IEEE, Proceeding of International Symposium on Parallel Architectures, Algorithms and Networks (ISPAN '02), 2002, pp. 1-12.

Song, H. Turner, J. and Lockwood, J., "Shape Shifting Tries for Faster IP Route Lookup", Proceedings of 13$^{th}$ IEEE International Conference on Network Protocols (ICNP '05), 2005.

Srinivasan, V. and Varghese, G., "Fast Address Lookups using Controlled Prefix Expansion", ACM Transactions on Computer Systems, Feb. 1999, vol. 17, No. 1, pp. 1-40.

Sun, X. and Zhao, Y.Q., "An On-Chip IP Address Lookup Algorithm", IEEE Transaction on Computers, Jul. 2005, vol. 54, No. 7, pp. 873-885.

Wang, M. Deering, S. Hain, T. and Dunn, L., "Non-Random Generator for IPv6 Tables", 12$^{th}$ Annual IEEE Symposium on High Performance Interconnects, 2004, pp. 35-40.

Akhbarizadeh, M.J., and Nourani, M. "Hardware-Based IP Routing Using Partitioned Lookup Table", IEEE/ACM Transactions on Networking, Aug. 2005, vol. 13, No. 4, pp. 769-781.

Lu, H., Kim, K.S., and Sahni, S., "Prefix and Interval-Partitioned Router-Tables", IEEE Communication Society Globecom, 2004, pp. 1590-1594.

Song, Y. and Aboelela, E., "A Parallel IP-Address Forwarding Approach Based on Partitioned Lookup Table Techniques", Proceedings of the 29th Annual IEEE International Conference on Local Computer Networks (LCN'04).

Tzeng, N.F., "Hardware-Assisted Design for Fast Packet Forwarding in Parallel Routers", Proceedings of the 2003 International Conference on Parallel Processing (ICCP'03).

Nourani, M. and Akhbarizadeh, M., "A Fully Scalable IP Forwarding Engine Based on Partitioned Lookup Table", IEEE Global Telecommunications Conference 2002, GLOBECOM '02, Nov. 2002, vol. 3, pp. 2333-2337.

Akhbarizadeh, M.J., and Nourani, M. "An IP Packet Forwarding Technique Based on Partitioned Lookup Table", IEEE International Conference on Communications ICC, 2002, vol. 4, pp. 2263-2267.

Chau, T. and Wong, K.C., "Pattern Discovery by Residual Analysis and Recursive Partitioning", IEEE Transactions on Knowledge and Data Engineering, Nov./Dec. 1999, vol. 11, No. 6, pp. 833-852.

* cited by examiner

```
Algorithm lookup(s, ht, h, d){
    // return the next hop for the destination d
    q = first s bits of d;
    u = remaining bits of d;
    t = ht[h(q)];      // home bucket if (t.type == 000 || t.key != q)
        // search auxiliary partition lr(ht) of ht
        return lr(ht).lookup(d);

// search in bucket t
    switch (t.type) {
    1: // examine next-level partition
        nh = lookup(t.stride, t.pointer, t.mask, u);
        if (nh == NULL) return lr(ht).lookup(d);
        else return nh;

001: // examine a leaf
        return t.nextHop;

010: // examine a base structure
        nh = t.pointer.lookup(u);
        if (nh == NULL) return lr(ht).lookup(d);
        else return nh;
    }
}
```

FIG. 3

```
Algorithm lookupA(s, ht, h, d){
    // return the next hop for the destination d
    q = first s bits of d;
    u = remaining bits of d;
    t = ht[h(q)]; // home bucket if (t.type == 000 || t.key != q)
        // search auxiliary partition lr(ht) of ht
        return lr(ht).lookup(d);

// search in bucket t
    switch (t.type) {
    1: // examine next-level partition
        return lookupA(t.stride, t.pointer, t.mask, u);

001: // examine a leaf
        return t.nextHop;

010: // examine a base structure
        return t.pointer.lookup(u);
    }
}
```

FIG. 4

RECURSIVELY PARTITIONED STATIC IP ROUTER TABLES

CROSS-REFERENCE TO A RELATED APPLICATION

This application is a National Stage Application of International Application Number PCT/US2007/076756, filed Aug. 24, 2007: which claims the benefit of U.S. Provisional Application Ser. No. 60/840,092, filed Aug. 25, 2006, which are hereby incorporated by reference in their entirety.

GOVERNMENT SUPPORT

This invention was made with government support under a grant awarded from the National Science Foundation under Grant No. IIS0326155. The government has certain rights in the invention.

FIELD OF THE INVENTION

The present invention generally relates to IP router tables; more specifically, to a method for partitioning a large static router-table into smaller tables.

BACKGROUND OF THE INVENTION

In general, incoming packets from several different networks are forwarded to their destination by routers using information such as the prefix of the destination address located in a packet header of an incoming packet and a router table. The router table for each router contains records of the best routes to various network destinations in the form addresses for the devices connected to the router. The address of the next device, which is connected to the router, that the router is to direct an incoming packet toward in order for the packet to reach the packet's final destination is called a next hop. The next hop for an incoming packet is computed by determining the longest prefix in the router table that matches the destination address of the packet; the packet is then routed to the destination specified by the next hop associated with the longest prefix.

Router tables generally operate in one of two modes: static (offline) or dynamic (online). In the static mode, update requests are performed offline using a background processor. With some periodicity, a new and updated forwarding table is then created. In the dynamic mode, lookup and update requests are processed in the order they appear. Thus, a lookup cannot be done until a preceding update has been done.

Many of the data structures developed for the representation of a router table are based on the fundamental binary trie structure. For a binary trie structure, branching is done based on the bits in the search key. The node in which a prefix is to be stored is determined by doing a search using that prefix as key. A node N is defined to be a node in a binary trie. Q(N) is defined as the bit string defined by the path from the root to N. Specifically, Q(N) is the prefix that corresponds to N. The next hop corresponding to Q(N) is stored in N.data in case Q(N) is one of the prefixes in the router table. For any destination address d, the longest matching prefix can be found by following a path beginning at the trie root and dictated by d. The last prefix encountered on this path is the longest prefix that matches d.

Several strategies have been proposed to improve the lookup performance of binary tries. For example, LC tries (S. Nilsson and G. Karlsson, *Fast address look-up for Internet routers*, IEEE Broadband Communications, 1998), Lulea (M. Degermark, A. Brodnik, S. Carlsson, and S. Pink., *Small forwarding tables for fast routing lookups*, Proceedings of SIGCOMM, 3-14, 1997), tree bitmap (W. Eatherton, G. Varghese, Z. Dittia, *Tree bitmap: hardware/software IP lookups with incremental updates*, Computer Communication Review, 34(2): 97-122, 2004), multibit tries (V. Srinivasan and G. Varghese, *Faster IP lookups using controlled prefix expansion*, ACM Transactions on Computer Systems, Feb. 1-40, 1999, shape shifting tries (H. Song, J. Turner, and J. Lockwood, *Shape shifting tries for faster IP route lookup*, Proceedings of 13th IEEE International Conference on Network Protocols, 2005), and hybrid shape shifting tries (W. Lu and S. Sahni, *Succinct representation of static packet classifiers*, University of Florida, 2006) have been employed. Other earlier partitioning schemes are limited to one front-end array and one-level prefix partitioning. The strides of current partitioning tables are usually fixed and not data dependent. In addition, earlier partitioning schemes represent all partitions using the same base structure. Although existing schemes are designed to keep the number of memory accesses required for an update at an acceptable level, they may increase the worst-case number of memory accesses required for a lookup and also increase the total memory required to store the structure. (See M. Ruiz-Sanchez, E. Biersack, and W. Dabbous, *Survey and taxonomy of IP address lookup algorithms*, IEEE Network, 2001, 8-23 and S. Sahni, K. Kim, and H. Lu, *Data structures for one-dimensional packet classification using most-specific-rule matching*, International Symposium on Parallel Architectures, Algorithms, and Networks (ISPAN), 2002, 3-14)

Accordingly, there exists a need for a method that provides less memory accesses for lookup, and less memory required overall.

BRIEF SUMMARY

The subject invention is directed to a method for partitioning a table, that addresses and/or substantially obviates one or more problems, limitations, and/or disadvantages of the prior art.

An object of the present invention is to provide a partitioning scheme that can provide less memory accesses for lookup, and less memory required overall.

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, there is provided a partitioning scheme for recursively partitioning a static IP router table, incorporating a binary trie T representing a prefix set of all possible destination addresses for routing packets, the trie T including: a first-level partition and a next-level partition, where the first-level partition includes subtries and an auxiliary trie, where the subtries are formed by selecting a stride s, where a node of the subtrie includes: 1) a path Q(N), from the root R of T to a root N of the subtrie, 2) a stride s for a next-level partition, 3) a mask that characterizes a next-level perfect hash function, and 4) a pointer to a hash table for the next-level partition; and where the auxiliary trie represents prefixes having a length less than stride s of the first-level partition, where a node of the auxiliary trie includes the root R; wherein the number of first-level partitions is $|D_s(R)|+1$, where $D_s(R)$ represents the level 1 descendents of root R, where l=s. Then, the next-level partition is formed by recursively repeating the subtrie formation of the first-level partition to each of the $|D_s(R)|+1$ partitions.

In another aspect of the present invention, there is provided a method of using the data structure to perform a lookup, including: identifying a hash table entry type of a partition from a first bit or first three bits of an entry of the hash table, the entry types including: type 1 which represents a partition that is further partitioned into next-level partitions, type 001 which represents a leaf partition, type 010 which represents a partition represented by a base structure, and type 000 which represents an unused hash table entry; stripping the first s bits from a destination address d, where s is a stride from a root R of the trie to a root N of the subtrie partition, where the first s bits define a key used to index into the hash table; and 1) if the entry type is the type 000 or if the first s bits do not match a key in the hash table, then performing a search of an auxiliary partition, 2) if the entry type is the type 001, then performing a search of the leaf, 3) if the entry type is the type 010, then performing a search of the base structure, or 4) if the entry type is the type 1, then performing a search of the next-level partition by repeating the method for performing a lookup.

In yet another aspect of the present invention, there is provided a 011 entry type which represents a partition that is further partitioned into next-level partitions, where the partition is represented by a front end array with $2^l$ entries when the partition stride is l.

It is to be understood that both the foregoing general description and the following detailed description of the present invention are exemplary and explanatory and are intended to provide further explanation of the invention as claimed.

BRIEF DESCRIPTION OF DRAWINGS

FIG. 1A shows a Trie T, and FIG. 1B shows a hash table representation.

FIG. 3 is an algorithm for searching with basic strategy.

FIG. 4 is an algorithm for searching with leaf pushing version A.

It should be understood that in certain situations for reasons of computational efficiency or ease of maintenance, the ordering and relationships of the blocks of the illustrated flow charts could be rearranged or re-associated by one skilled in the art.

DETAILED DISCLOSURE OF THE INVENTION

The subject invention as shown in the Figures and described below provides a method for recursively partitioning a large static router-table into smaller tables. The smaller tables can be represented using known static router-table structures. In one embodiment example, the smaller tables can be represented using a multi-bit trie (MBT) as taught by V. Srinivasan and G. Varghese, *Faster IP lookups using controlled prefix expansion*, ACM Transactions on Computer Systems, Feb. 1-40, 1999. In another embodiment example, the smaller tables can be represented using a hybrid shape shifting trie (HSST) as taught by W. Lu and S. Sahni, *Succinct representation of static packet classifiers*, University of Florida, 2006. Embodiments of the subject invention can permit multi-level partitioning. In further embodiments, a heterogenous collection of base structures can be selected to optimize memory utilization. In embodiments, different methods, such as a front-end array method and a hash table with auxiliary partition method, can be used to keep track of the partitions of a prefix set. In such an embodiment, the optimal method for each partitioning can be selected through the use of dynamic programming. In one embodiment employing a front-end array to keep track of partitions where the base structure is a multibit node, the recursive partitioning can be reduced to variable-stride tries. In one embodiment, recursive partitioning can be performed as described below.

Figures 1A, 1B:
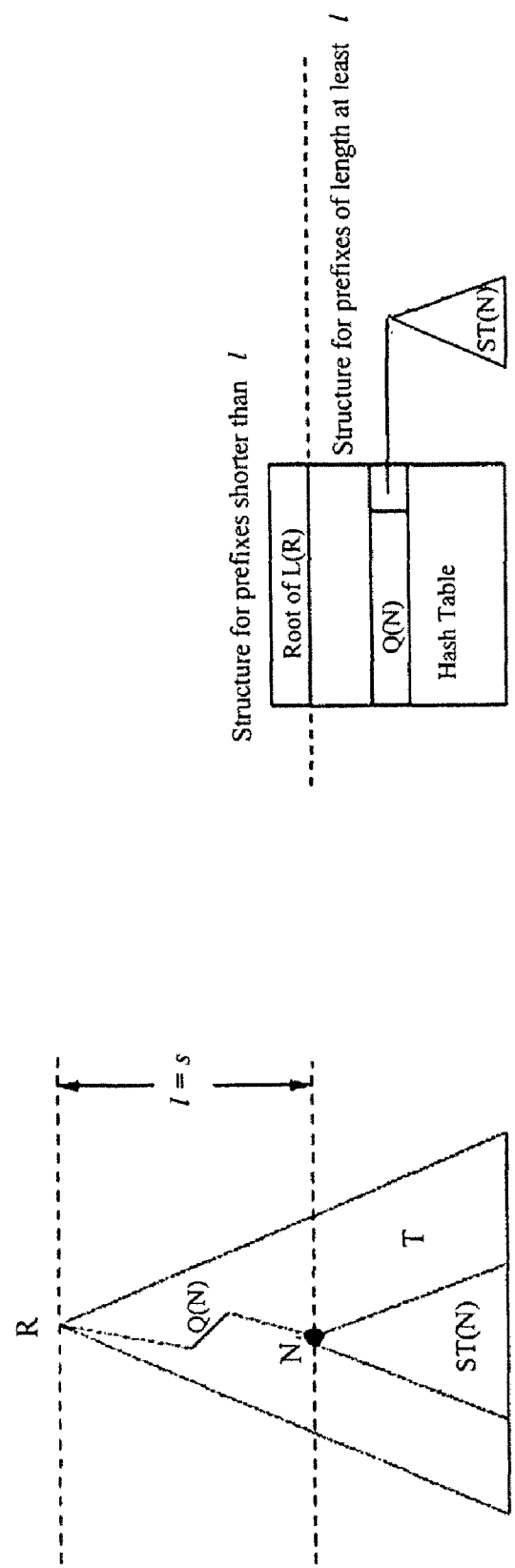
FIGS. 1A and 1B show a representation of stride s partitioning of binary trie T.

Referring to FIG. 1A, a given prefix set can be represented by binary trie T. A stride s can be selected for partitioning the binary trie into subtries. The level l descendents of the root R of T can be represented by $D_l(R)$, where the root is at level l=0. Thus, $D_0(R)$ is R and $D_l(R)$ is the children of R. When the trie is partitioned with stride s, each subtrie, S'T(N), rooted at a node $N \in D_s(R)$ defines a partition of the router table. Here, $0 < s \leq T.height+1$, where T.height is the maximum level at which there is a descendent of R. Thus when s=T.height+1, $D_s(R)=0$. In addition to the partitions defined by DAR), there can be an auxiliary partition L(R), which is defined by prefixes whose length is less than the selected stride s. The prefixes in L(R) can be those stored in $D_i(R)$, where $0 \leq i < s$ such that the total number of partitions is $|D_s(R)|+1$. These partitions are called the first-level partitions of T. To keep track of the first-level partitions of T, a hash table with a perfect hashing function for the partitions defined by $N \in D_s(R)$ can be constructed.

In one embodiment of the invention, when s=T.height+1, the hash table is empty and L(R)=T. Here, T can be represented by a base structure such as MBT or HSST.

In a further embodiment, when s<T.height+1, the above described partitioning scheme can be applied recursively to each of the $|D_s(R)|+1$ partitions to obtain lower-level (or next-level) partitions. However, where $N \in D_s(R)$ is a leaf, the next hop associated with the corresponding prefix can be stored directly in the hash table.

FIG. 1B shows a representation of the hash table. Referring to FIG. 1B, the root of the data structure used for L(R) can be placed adjacent, in memory, to the hash table. The bit strings Q(N), $N \in D_s(R)$ define the keys used to index into the hash table. In one embodiment the perfect hashing function can be defined by J. Lunteren in "Searching very large routing tables in fast SRAM" published in *Proceedings ICCCN,* 2001, and "Searching very large routing tables in wide embedded memory" published in *Proceedings Globecom,* 2001.

Figure 2:
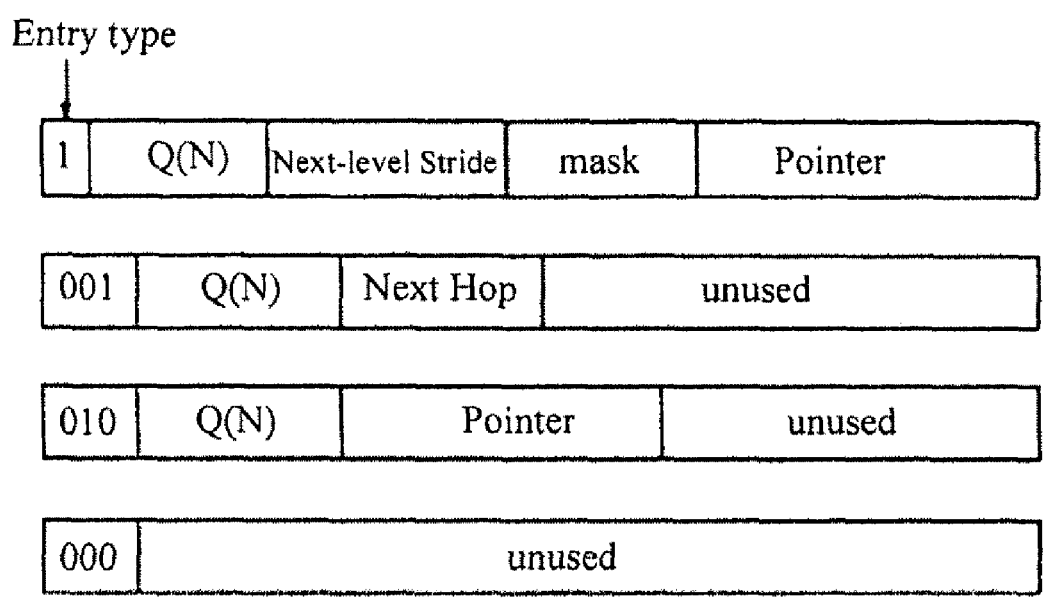
FIG. 2 is a representation of hash table entry types.

In a preferred embodiment, each entry in the hash table can, therefore, represent one of four types of information:

Type 1: A partition that is further partitioned into lower-level partitions
Type 001: A leaf partition
Type 010: A partition that is represented by a base structure
Type 000: An unused hash table entry Referring to FIG. 2, for type-1 entries, one bit can be used to identify the entry type. In addition, the path Q(N) from the root R to the root N of the partition, the stride for the next-level partition, a mask that characterizes the next-level perfect hash function, and a pointer to the hash table for the next-level partition can be stored in memory. For the remaining three types, three bits can be used to identify the entry type. For entry type-001, Q(N) and the next hop associated with the prefix stored in node N can be stored. For type-010, Q(N) and a pointer to the base structure used for the partition can be stored. Type-000 entries can be left unused and store no additional information.

Because prefixes in the same first-level partition agree on their first l bits, these l bits can be removed from the prefixes in the same first-level partition before developing lower-level partitions. Therefore, in one embodiment, a prefix of length l can be replaced by a prefix of length 0.

A lookup function can be performed in router tables partitioned in accordance with embodiments of the subject invention. FIG. 3 shows an algorithm for performing a lookup in a router table that has been partitioned according to embodiments described above and having at least one level of partitioning. The initial invocation specifies for a first-level partitioning, the stride s, the address of first hash table entry ht, the perfect hash function h (specified by its mask), and the destination d.

In another embodiment, the worst-case number of memory accesses required for a lookup can be reduced using controlled leaf pushing. Controlled leaf pushing can be performed similar to the standard leaf pushing used in non-partitioned router tables as described in V. Srinivasan and G. Varghese, *Faster IP lookups using controlled prefix expansion*, SIGMETRICS, 1998. In controlled leaf pushing, every base structure that does not have a 'stripped' or removed prefix of length 0 can be given a length 0 prefix whose next hop is the same as that of the longest prefix that matches the bits stripped from all prefixes in that partition. In an embodiment example, a base structure can have stripped prefixes of 00, 01, 101 and 110. All four of these prefixes can have had the same number of bits stripped from their left end. The stripped bits are the same for all four prefixes. Supposing that the stripped bits are 010, then because the partition does not have a length 0 prefix, the partition inherits a length 0 prefix whose next hop corresponds to the longest of *, 0, 01 and 010 that is in the original set of prefixes. Assuming that the original prefix set contains the default prefix, the inheritance of a length 0 prefix as stated above ensures that every search in a partition finds a matching prefix and hence a next hop. An embodiment of this approach is shown in FIG. 4 with the lookup algorithm lookupA.

In a preferred embodiment of the invention, an appropriate stride can be selected for each partitioning that is done. In one embodiment, the stride can be selected by setting up a dynamic programming recurrence. Let B(N, l, r) be the minimum memory required to represent levels 0 through/of the subtrie of T rooted at N by a base structure. In a specific embodiment the base structure can be MBT or HSST. A lookup in this form of base structure can take no more than r memory accesses. Let H(N, l) be the memory required for a stride l hash table for the paths from node N of T to nodes in Dl(N). Let C(N, l, r) be the minimum memory required by a recursively partitioned representation of the subtrie defined by levels 0 through l of ST (N). From the definition of recursive partitioning, the choices for l in C(N, l, r) are between the range of 1 and N.height+1, where N.height is the height of node N. When/is equal to one more than N.height, ST(N) is represented by the base structure.

Thus, it follows that $$C(N, N \cdot \text{height}, r) = \qquad (1)$$
$$\min\left\{B(N, N \cdot \text{height}, r), \min_{0 < l \leq N \cdot \text{height}}\left\{H(N, l) + C(N, l-1, r-1) + \sum_{Q \in D_l(N)} C(Q, Q \cdot \text{height}, r-1)\right\}\right\}, r > 0$$

$$C(N, l, 0) = \infty \qquad (2)$$

The above recurrence assumes that no memory access is needed to determine whether the entire router table has been stored as a base structure. Further, in case the router table has been partitioned then no memory access is needed to determine the stride and mask for the first-level partition as well as the structure of the auxiliary partition. Determining the stride and mask is possible if this information is stored in memory registers. However, as the search progresses through the partition hierarchy, this information has to be extracted from each hash table. So, each type-1 hash-table entry can either store this information or the recurrence can be changed to account for the additional memory access required at each level of the partition to get this information. In the former case, the size of each hash-table entry is increased. In the latter case, the recurrence becomes $$C(N, N \cdot \text{height}, r) = \qquad (3)$$
$$\min\left\{B(N, N \cdot \text{height}, r), \min_{0 < l \leq N \cdot \text{height}}\left\{H(N, l) + C(N, l-1, r-2) + \sum_{Q \in D_l(N)} C(Q, Q \cdot \text{height}, r-1)\right\}\right\}, r > 0$$

$$C(N, l, r) = \infty, r \leq 0 \qquad (4)$$

Experiments with real-world router tables indicate that when auxiliary partitions are restricted to be represented by base structures, the memory requirement is reduced. With this restriction, the dynamic programming recurrence becomes $$C(N, N \cdot \text{height}, r) = \qquad (5)$$
$$\min\left\{B(N, N \cdot \text{height}, r), \min_{0 < l \leq N \cdot \text{height}}\left\{H(N, l) + B(N, l-1, r-1) + \sum_{Q \in D_l(N)} C(Q, Q \cdot \text{height}, r-1)\right\}\right\}, r > 0$$

$$C(N, l, 0) = \infty \qquad (6)$$

The second parameter l of C(N, l, r) generally is the node's height, N.height and so this second parameter may be dropped.

In another embodiment of the invention, optimization is possible by permitting the method used to keep track of partitions to be either a hash table plus an auxiliary structure for prefixes whose length is less than the stride or a simple array with $2^l$ entries when the partition stride is l. Including this added flexibility, but retaining the restriction that auxiliary partitions are represented as base structures, the dynamic programming recurrence becomes $$C(N, N \cdot \text{height}, r) = \tag{7}$$
$$\min\left\{B(N, N \cdot \text{height}, r), \min_{0 < l \leq N \cdot \text{height}} \left\{H(N, l) + B(N, l-1, r-1) + \sum_{Q \in D_l(N)} C(Q, Q \cdot \text{height}, r-1)\right\},\right.$$
$$\left.\min_{0 < l \leq N \cdot \text{height}} \left\{2^l c + \sum_{Q \in D_l(N)} C(Q, Q \cdot \text{height}, r-1)\right\}\right\}$$

$$C(N, l, 0) = \infty \tag{8}$$

where c is the memory required by each position of the front-end array. Again, the second parameter in C may be dropped. The inclusion of front-end arrays as a mechanism to keep track of partitions requires the addition of a fifth entry type (011) for hash table entries. This fifth type, which indicates a partition represented using a front-end array, includes a field for the key Q(N), another field for the stride of the next-level partition, and a pointer to the next-level front-end array. The fifth entry type (011) is similar to the first type (1). Both represent a partition that is further partitioned into next-level partitions and include fields for key Q(N) and next-level stride. However, type (1) entries include a pointer pointing to a next-level hash table and a mask for this hash table, while type (011) entries include a pointer pointing to a next-level front-end array.

Even though it is preferred to have all base structures in a recursively partitioned router table be of the same type (i.e., all are MBTs or all are HSSTs), in another embodiment of the invention, it is possible to solve the dynamic programming recurrences allowing a mix of basic structures.

The following are examples of implementation of one embodiment of the subject invention.

Example 1

36-Bit Design

In one embodiment example, 36 bits are allocated to each hash entry. For IPv4, 8 bits for Q(N), 2 bits for the stride of the next-level partition, 8 bits for the mask, and 17 bits for the pointer are used. Although eight bits are allocated to Q(N), the strides are limited to be from five to eight. Hence, two bits are sufficient to represent the next-level stride. The use of a 17-bit pointer enables one to index up to 9 Mbits ($2^{17} \times 72$) of SRAM. For IPv6, the corresponding bit allocations are 7, 2, 7, and 19, respectively. For IPv6, the strides were limited to be from four to seven. Hence seven bits suffice for Q(N) and two bits suffice for the next-level stride. The 19-bit pointers are able to index a 36M bit SRAM. For the next-hop field, 12 bits were allocated for both IPv4 and IPv6. For the base structure, the enhanced base was used with end-node optimization (EBO) version of HSSTs as these were shown to be the most efficient router-table structure for static router tables. Non-leaf EBO nodes have child pointers and some EBO leaf nodes have pointers to next-hop arrays. For child pointers 10 bits were allocated. This allows one to index 1024 nodes. The dynamic programming equations developed in W. Lu and S. Sahni, *Succinct representation of static packet classifiers*, University of Florida, 2006, can be modified for the construction of optimal EBOs so that EBOs that require more than 1024 nodes are rejected. For next-hop array pointers, 22 bits were allocated. Since, the number of next-hop array pointers is bounded by the number of prefixes in the router table and next-hop arrays are stored in a different part of memory from where the rest of the EBO data structure is stored, an allocation of 22 bits for next-hop array pointers suffices for $2^{22} > 4$ million prefixes. For the next hops themselves, 12 bits were allocated.

Example 2

72-Bit Design

In another embodiment example, 72 bits were allocated for each hash-table entry. For both IPv4 and IPv6, 17 bits were used for Q(N), five bits for the stride of the next-level partition, 17 bits for the mask, and 19 bits for the pointer. The strides were limited to be between 1 and 17. Also, the next hop for the stripped prefix * (if any) in L(R) is stored in each hash-table entry. Partitioning was enabled so that at each node N, a selection was made between using an L(R) partition represented as an EBO and a (perfect) hash table for the remaining partitions and performing a prefix expansion of the stripped prefixes in L(R)−{*}, distributing these expanded prefixes into the remaining partitions, and then constructing a hash table for the modified partition set. Type 1 nodes use a designated bit to distinguish between the different hash-table types they may point to.

Experimental Results

To assess the efficacy of the recursive partitioning scheme, C++ codes for the examples described were compiled using the Microsoft Visual C++ compiler with optimization level O2 and run on a 3.06 GHz Pentium 4 PC. For benchmarking purposes the router table resided on a QDRII SRAM (dual burst), which supports the retrieval of 72 bits of data with a single memory access. The recursive partitioning scheme was compared against 1) a one-level partitioning scheme, OLP, which is a generalization of the front-end array used in Lampson et al. (Lampson, Srinivasan, and Varghese, *IP lookup using multi-way and multicolumn search*, IEEE INFOCOM, 1998); and 2) a non-partitioned EBO. OLP does only one level of partitioning and uses EBO as the base structure. However, unlike Lampson et al. which fixes the size of the front-end array to 216, OLP selects an optimal, data-dependent, size for the front-end array. Note that using a front-end array of size 0 is equivalent to using no front-end array. OLP was found to be superior, on the given data sets, to limiting the subject invention's recursive partitioning scheme so as to partition only at the root level.

All of the programs were written so as to construct lookup structures that minimize the worst-case number of memory accesses needed for a lookup and minimize the total memory needed to store the constructed data structure.

Figure 5:
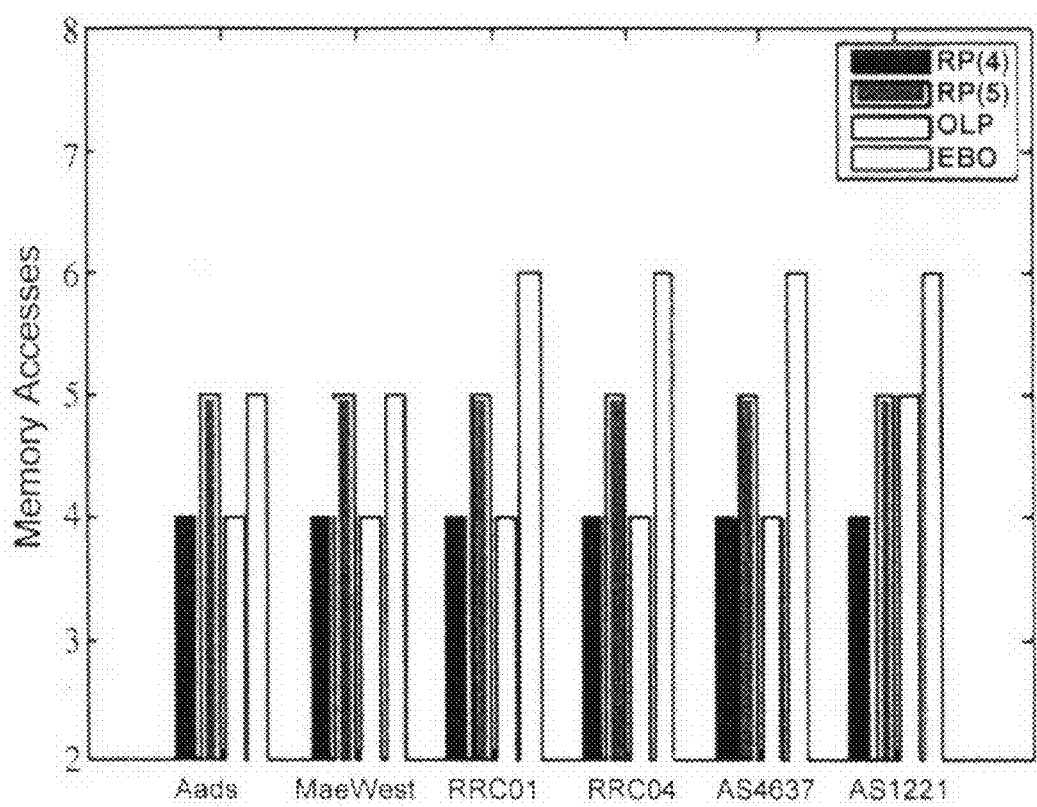
FIG. 5 shows a chart representation of memory accesses required for a lookup in IPv4 tables.
Figure 6:
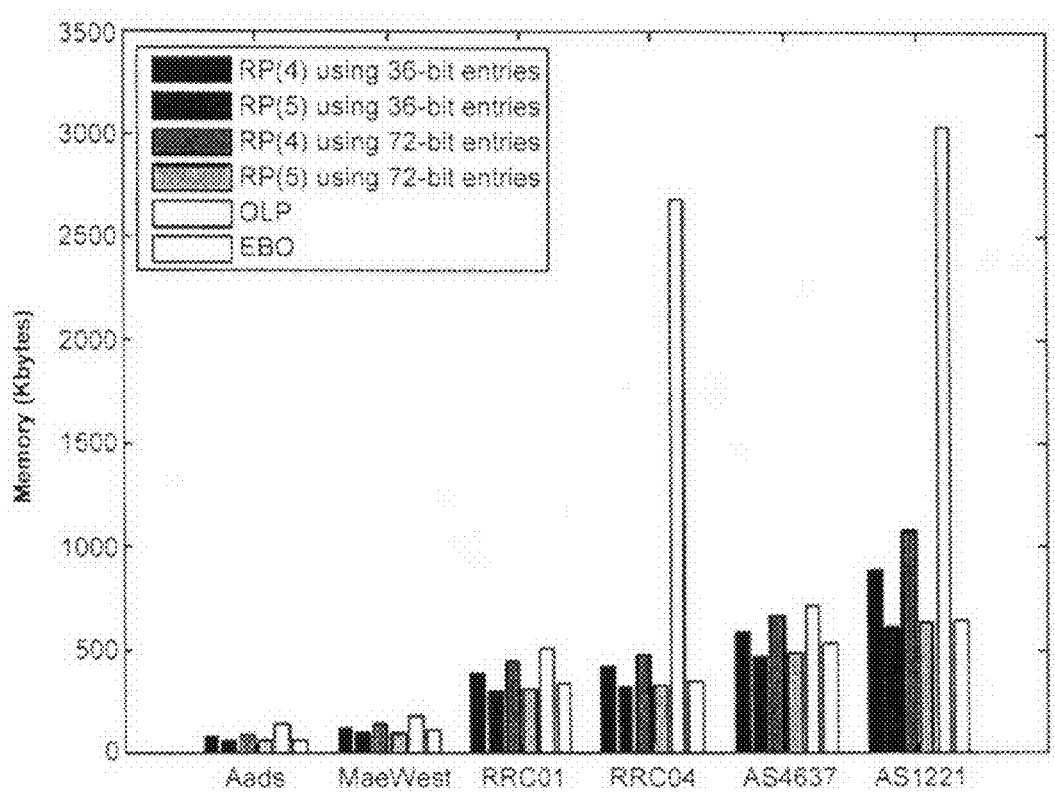
FIG. 6 shows a chart representation of total memory required for IPv4 tables.

Six IPv4 router tables Aads, MaeWest, RRC01, RRC04, AS4637 and AS1221 were used. The number of prefixes in these router tables is 17486, 29608, 103555, 109600, 173501 and 215487, respectively. Table 1 shows the number of memory accesses and memory requirement for the tested lookup structures. RP(k) (K=4, 5) denotes the space-optimal recursively partitioned structure that requires at most k memory accesses per search. FIGS. 5 and 6 plot this data.

TABLE 1

Memory accesses and total memory (KBytes) required for IPv4 tables

| Database | 36-bit entries | | 72-bit entries | | OLP | | EBO | |
|---|---|---|---|---|---|---|---|---|
| | RP(4) | RP(5) | RP(4) | RP(5) | Accesses | Memory | Accesses | Memory |
| Aads | 77 | 59 | 90 | 61 | 4 | 141 | 5 | 68 |
| MaeWest | 124 | 98 | 143 | 100 | 4 | 186 | 5 | 113 |
| RRC01 | 392 | 300 | 442 | 309 | 4 | 507 | 6 | 335 |
| RRC04 | 417 | 318 | 474 | 327 | 4 | 2687 | 6 | 354 |
| AS4637 | 591 | 473 | 669 | 485 | 4 | 717 | 6 | 530 |
| AS1221 | 861 | 611 | 1080 | 634 | 5 | 3041 | 6 | 664 |

For the memory access count, RP(4) is superior to EBO on all six data sets by one or two accesses. OLP is superior to EBO by one access on three of the given data sets and by two accesses on the remaining 3 data sets. For the memory access count, RP(5) is superior to EBO by one access on four of the six data sets. OLP required one more access than RP(4) on the largest data set (AS1221) and tied with RP(4) on the remaining five. On all the test sets, the 36-bit implementation required less memory than required by the corresponding 72-bit implementation. In fact, the 36-bit implementation required between 80% and 98% of the memory required by the 72-bit implementation, the average being 92% with a standard deviation is 6%.

Table 2 gives the memory requirement of the lookup structures normalized by the memory requirement for RP(4) using 36-bit entries. Compared to RP(4) with 36-bit entries, OLP required from 21% to 544% more memory, while EBO required between 9% and 25% less memory. Among all six representations, RP(5) using 36-bit entries was the most memory efficient. Compared to EBO, this implementation of RP(5), used between 5% and 13% less memory; the average reduction is memory required was 10% and the standard deviation as 3%.

TABLE 2

Statistics for IPv4 memory requirement normalized by that for RP(4) using 36-bit entries

| Algorithm | Min | Max | Mean | Standard Deviation |
|---|---|---|---|---|
| RP(5) using 36-bit entries | 0.71 | 0.80 | 0.77 | 0.03 |
| RP(4) using 72-bit entries | 1.13 | 1.25 | 1.16 | 0.05 |
| RP(5) using 72-bit entries | 0.74 | 0.82 | 0.79 | 0.03 |
| OLP | 1.21 | 6.44 | 2.64 | 2.05 |
| EBO | 0.75 | 0.91 | 0.86 | 0.06 |

Overall, the 36-bit implementation of RP(4) is superior to OLP on both worst-case memory accesses and total memory requirement, which resulted in a 25% to 50% reduction in worst-case memory accesses over EBO. This reduction came at the expense of an increase in required memory between 10% and 37%. The 36-bit implementation of RP(5) improved the lookup time by up to 20% relative to the base EBO structure and reduced total memory by 10% on average.

Figure 7:
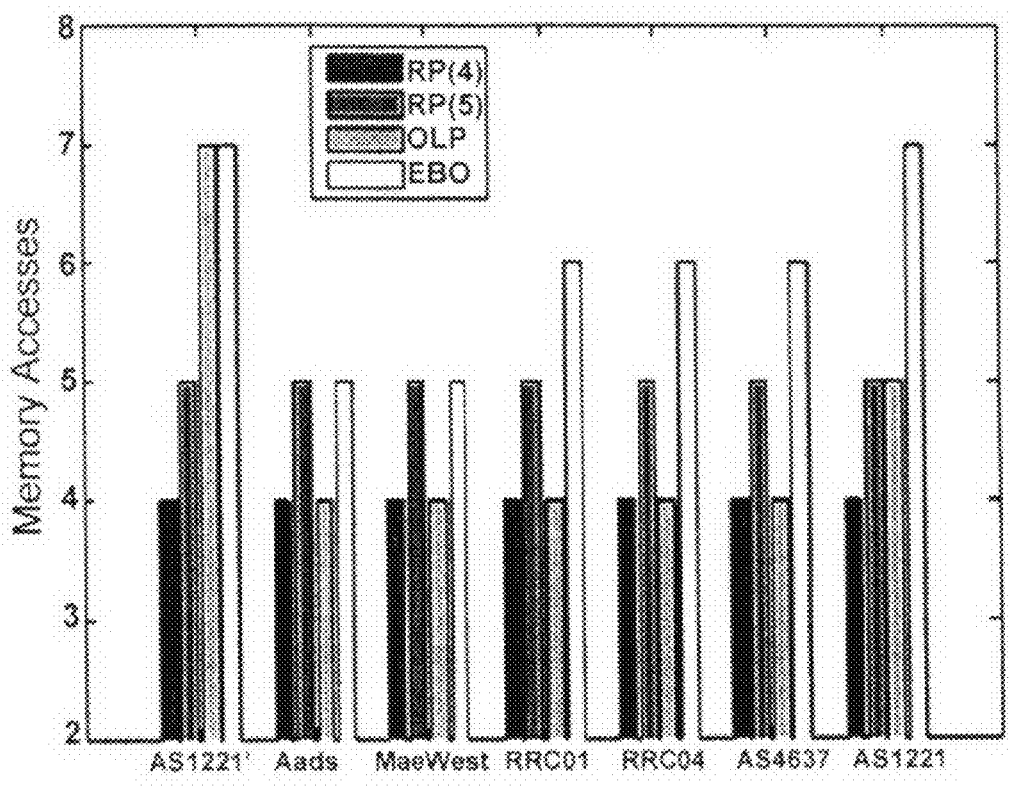
FIG. 7 shows a chart representation of memory accesses required for a lookup in IPv6 tables.
Figure 8:
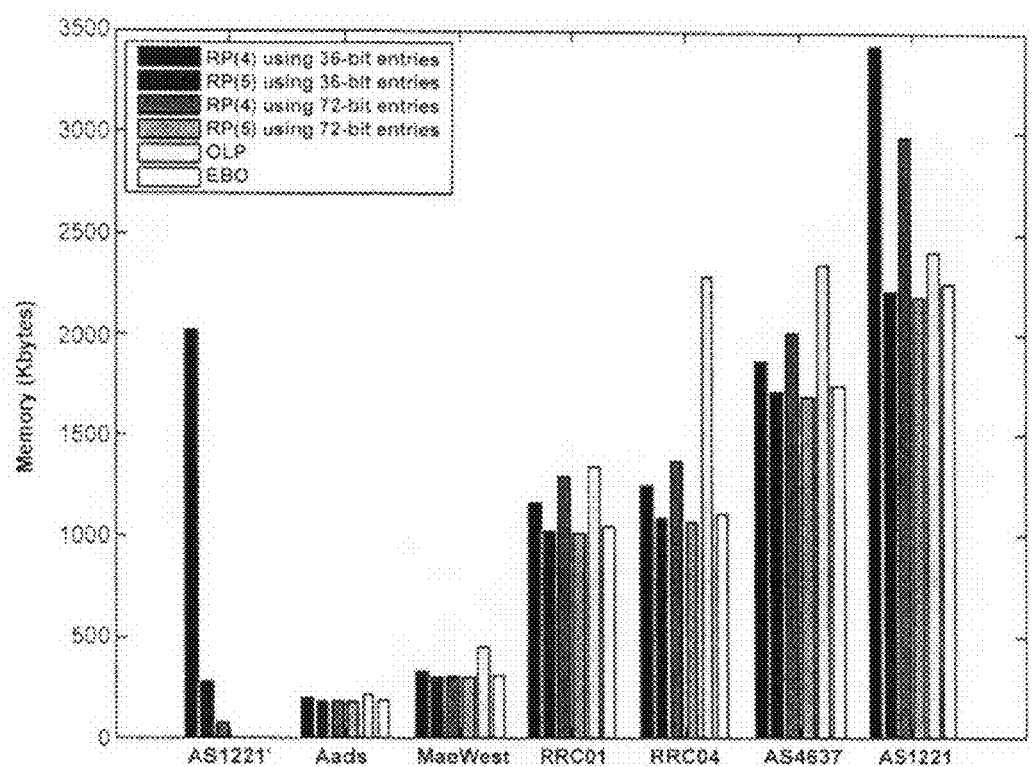
FIG. 8 shows a chart representation of total memory required for IPv6 tables.

For IPv6 experiments, the 833-prefix AS1221-Telstra router table as well as six synthetic IPv6 tables were used. Prefixes longer than 64 were removed from the AS1221—Telstra table as current IPv6 address allocation schemes use at most 64 bits (see M. Wang, S. Deering, T. Hain, and L. Dunn, *Non-random Generator for IPv6 Tables,* 12th Annual IEEE Symposium on High Performance Interconnects, 2004). For the synthetic tables, a 16-bit string comprised of 001 followed by 13 random bits was prepended to each IPv4 prefix (see IPv6 Address Allocation and Assignment Policy (APNIC)). If this prepending didn't at least double the prefix length, a sufficient number of random bits were appended so that the length of the prefix is doubled. Following this prepending and possible appending, the last bit was dropped from one-fourth of the prefixes so as to maintain the 3:1 ratio of even length prefixes to odd length observed in real router tables. Each synthetic table was given the same name as the IPv4 table from which it was synthesized. The AS1221-Telstra IPv6 table is named AS1221* to distinguish it from the IPv6 table synthesized from the IPv4 AS1221 table. Table 3 gives the number of memory accesses and memory requirement for the IPv6 data sets. FIGS. 7 and 8 plot this data.

TABLE 3

Memory accesses and total memory (KBytes) required for IPv6 tables

| Database | 36-bit entries | | 72-bit entries | | OLP | | EBO | |
|---|---|---|---|---|---|---|---|---|
| | RP(4) | RP(5) | RP(4) | RP(5) | Accesses | Memory | Accesses | Memory |
| AS1221* | 2021 | 282 | 79 | 5.7 | 7 | 4.6 | 7 | 4.6 |
| Aads | 197 | 179 | 183 | 178 | 4 | 221 | 5 | 184 |
| MaeWest | 332 | 302 | 309 | 299 | 4 | 456 | 5 | 311 |
| RRC01 | 1165 | 1027 | 1295 | 1015 | 4 | 1348 | 6 | 1046 |
| RRC04 | 1253 | 1088 | 1372 | 1075 | 4 | 2287 | 6 | 1108 |
| AS4637 | 1871 | 1712 | 2013 | 1695 | 4 | 2346 | 6 | 1752 |
| AS1221 | 3432 | 2217 | 2979 | 2188 | 5 | 2414 | 7 | 2252 |

As was the case for the IPv4 experiments, RP(4) was the best in terms of lookup complexity. Particularly, RP(4) required one to three fewer memory accesses than required by EBO for a lookup. RP(4) and OLP tied on five of the seven data sets. On one data set, RP(4) required 3 fewer memory accesses and on the other, it required one less access. RP(5) outperformed EBO by one or two accesses on five data sets and tied on the remaining two.

In contrast to the experiments with IPv4 tables, the 72-bit implementation of recursive partitioning generally required less memory than did the 36-bit implementation. On 11 of the 14 tests (RP(4) and RP(5)) with recursive partitioning, the memory required by the 72-bit implementation was less than that required by the 36-bit implementation and it was more on the remaining three tests. The memory of recursively partitioned structure using 36-bit hash entries normalized by the memory required using 72-bit entries ranged from 0.9 to 49.9. The data set AS1221* incurred the largest difference. When AS1221* was excluded, the normalized number for the remaining six data sets was between 0.90 to 1.15 and the mean and standard deviation were 1.00 and 0.00. For the data set AS1221*, the 72-bit implementation of RP(4) reduced the memory accesses of EBO by three but required 17 times as much memory.

The same implementation of RP(5) required 24% more memory than required by the base EBO structure. On the other hand, RP(6) required 3.8 Kbytes hence, a 17% memory reduction accompanied by a reduction in memory accesses of one. For this data set, OLP yielded no improvement over EBO, thus, OLP wound up using a front-end table of size 0. For the remaining six data sets, RP(5) required slightly less memory than EBO. On five of the six data sets, OLP required more memory than did RP(4). On the sixth data set, AS1221, OLP took less memory. However, when the same budget for worst-case memory accesses was used, RP(5) using 72-bit entries required 9% less memory than OLP on AS1221.

TABLE 4

IPv6 data normalized by the memory required by RP(4) using 72-bit entries. The data set AS1221* is excluded here.

| Algorithm | Min | Max | Mean | Standard Deviation |
|---|---|---|---|---|
| RP(4) using 36-bit entries | 0.90 | 1.15 | 1.00 | 0.11 |
| RP(5) using 36-bit entries | 0.74 | 0.98 | 0.86 | 0.10 |
| RP(5) using 72-bit entries | 0.73 | 0.97 | 0.85 | 0.10 |
| OLP | 0.81 | 1.67 | 1.23 | 0.31 |
| EBO | 0.76 | 1.00 | 0.87 | 0.11 |

Table 4 presents the statistics normalized by the memory required by RP(4) using 72-bit entries for the remaining six data sets. As can be seen, the memory of EBO normalized by RP(4) using 72-bit entries ranged from 0.76 to 1.00, with the mean and standard deviation being 0.87 and 0.11. The corresponding normalized numbers for OLP were 0.81, 1.67, 1.23, and 0.31.

While both OLP and recursive partitioning are able to improve the lookup performance of EBO, OLP does this with a much larger memory cost. The experiments demonstrate the superiority of recursive partitioning over even a generalized version of the standard front-end array method. For IPv4 tables, recursive partitioning with 36-bit entries is superior to using larger hash-table entries (e.g., 72 bits) while for IPv6 tables, 72-bit entries often resulted in reduced memory requirement. Using even larger hash-table entries (e.g., 144 bits) resulted in no reduction in memory required by either RP(4) or RP(5) for the IPv4 and IPv6 test data.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, programmable logic device, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

All patents, patent applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A non-transitory computer-readable medium having stored thereon a data structure, the data structure comprising:
   a binary trie T representing a prefix set of all possible destination addresses for routing packets, the binary trie T comprising:
   a first-level partition, wherein the first-level partition comprises:
      a subtrie formed by selecting a stride s for the first-level partition, where $0 < s \leq T.height+1$, where T.height is the maximum level at which there is a descendent of a root R, wherein a node of the subtrie includes:
         a path Q(N), from the root R of the binary trie T to a root N of the subtrie,
         a next stride for a next-level partition,
         a mask that characterizes a next-level perfect hash function, and
         a pointer to a hash table for the next-level partition;
      an auxiliary trie representing prefixes having a length less than stride s of the first-level partition, wherein a node of the auxiliary trie includes the root R;
   wherein the number of first-level partitions is $|D_s(R)|+1$, where $D_s(R)$ represents the level l descendents of root R, where $l=s$, the next-level partition formed by recursively repeating subtrie formation of the first-level partition to each of the $|D_s(R)|+1$ first-level partitions.

2. The non-transitory computer-readable medium according to claim 1, wherein at least one of the binary trie T, the first-level partition, the auxiliary trie, and the next-level partition is represented by a base structure selected from the group consisting of multi-bit trie (MBT) and hybrid shape shifting trie (HSST).

3. The non-transitory computer-readable medium according to claim 2, wherein the base structure is an end-node optimization version of HSST.

4. The non-transitory computer-readable medium according to claim 1, wherein each node is allocated 36 bits, with 8 bits for the mask, 8 bits for the path Q(N) with strides limited to be from 5 to 8, 2 bits for the next stride for the next-level partition, and 17 bits for the pointer.

5. The non-transitory computer-readable medium according to claim 1, wherein each node is allocated 36 bits, with 7 bits for the mask, 7 bits for the path Q(N), 2 bits for the next stride for the next-level partition, and 19 bits for the pointer.

6. The non-transitory computer-readable medium according to claim 1, wherein each node is allocated 72 bits, with 17 bits for the mask, 17 bits for the path Q(N), 5 bits for the next stride for the next-level partition, and 19 bits for the pointer.

7. A computer implemented method for performing a look-up in a router table of a router using a data structure and a hash table stored thereon, the data structure comprising a first-level partition of a trie T including an auxiliary partition and a subtrie partition, and the hash table having one or more entry types for keeping track of the first-level partitions of the trie T, the method comprising:
 identifying the entry type of a partition from a first m bits of an entry of the hash table stored in a memory of the router, where m is a number of bits,
  wherein a first value of the m bits represents a partition that is further partitioned into next-level partitions,
  wherein a second value of the m bits represents a leaf partition,
  wherein a third value of the m bits represents a partition represented by a base structure, and
  wherein a fourth value of the m bits represents an unused hash table entry;
 stripping the first s bits from a destination address d received by the router, where s is a stride from a root R of the trie to a root N of the subtrie partition, wherein the first s bits define a key used to index into the hash table to obtain a hash entry; and
 if the entry type of the hash entry corresponds to the fourth value of the m bits or if the first s bits do not match a key in the hash table, then performing a search of an auxiliary partition to find a matching destination address;
 if the entry type of the hash entry corresponds to the second value of the m bits, then performing a search of the leaf to determine a next hop of the destination address d;
 if the entry type of the hash entry corresponds to the third value of the m bits, then performing a search of the base structure to obtain a pointer to the destination address d;
 if the entry type of the hash entry corresponds to the first value of the m bits, then performing a search of the next-level partition by stripping a next stride number of bits from the destination address and performing a search according to the entry type corresponding to the stripped next stride number of bits.

8. The method according to claim 7, wherein the data structure further comprises a fifth value of the m bits, wherein the fifth value of the m bits represents a front-end array partition for keeping track of partitions, wherein a node of the front-end array partition includes a key Q(N), a stride $s_n$ for a next-level partition, and a pointer to the next-level front-end array, the method further comprising:
 keeping track of the partitions using the front-end array partition.

9. The method according to claim 8, wherein when the stride $s_n$ for the next-level partition is of length l, where l is less than the stride s, the front-end array partition has $2^l$ entries.

10. A computer implemented method for performing a look-up in a router table of a router using a data structure and a hash table stored thereon, the data structure comprising a first-level partition of a trie including an auxiliary partition and a subtrie partition, the method comprising:
 stripping the first s bits from a destination address received by the router, where s is a stride from a root of the trie to a root of the subtrie partition, wherein the first s bits define a key used to index into the hash table stored on a memory of the router; and
 performing a search of an entry-type partition corresponding to an entry of the hash table indexed by the stripped first s bits of the destination address to find a longest matching prefix of the destination address,
 wherein the hash table comprises a first entry type corresponding to a partition that is further partitioned into next-level partitions, a second entry type corresponding to a leaf partition, a third entry type corresponding to a partition represented by a base structure, and a fourth entry type corresponding to the auxiliary partition.

11. The method according to claim 10, wherein the entry-type partition is at least one selected from the group consisting of the partition that is further partitioned into next-level partitions, the leaf partition, the partition represented by the base structure, and the auxiliary partition.

12. The method according to claim 11, further comprising using controlled leaf pushing for the partition represented by the base structure.

13. The method according to claim 11, wherein a prefix having a length less than the stride is also stored in the auxiliary partition.

14. The method according to claim 13, wherein the search is performed in the auxiliary partition when the key does not index to the hash table.

15. The method according to claim 10, wherein the data structure further comprises a front-end array partition, the method further comprising keeping track of partitions of the trie using the front-end array partition.

16. The method according to claim 15, wherein the front-end array partition has $2^s$ entries in the memory, where s is the stride.

17. The method according to claim 15, further comprising:
 recursively partitioning the router table of the router to form the data structure comprising the first-level partition of the trie including the auxiliary partition and the subtrie partition before stripping the first s bits from the destination address received by the router, wherein recursively partitioning the router table of the router comprises:
 selecting the stride s for partitioning the trie T into subtries ST(N) rooted at a node N of T, each subtrie ST(N) rooted at a node $N \in D_S(R)$ defining a partition of the router table, where $D_S(R)$ are descendents in T that are at level s of the subtrie of T rooted at R, $0 < s \leq$ T.height+1, where T.height is a maximum level at which there is a descendent of R, and the auxiliary partition L(R) is defined by prefixes whose length is less than the stride s,
wherein selecting the stride s comprises computing:

$$C(N, N \cdot height, r) = \min\left\{B(N, N \cdot height, r), \min_{0<l\leq N \cdot height}\left\{H(N, l) + B(N, l-1, r-1) + \sum_{Q\in D_l(N)} C(Q, Q \cdot height, r-1)\right\}, \min_{0<l\leq N \cdot height}\left\{2^l c + \sum_{Q\in D_l(N)} C(Q, Q \cdot height, r-1)\right\}\right\}$$

where $C(N,1,0)=\infty$ and c is the memory required by each position of the front-end array, where $C(N,l,r)$ is the minimum memory required by a recursively partitioned representation of the subtrie defined by levels 0 through l of ST(N), where $1\leq l\leq N.height+1$, where N.height is the height of node N, and r is a maximum number of memory accesses, $B(N,l,r)$ is a minimum memory required to represent levels 0 through l of the subtrie of T rooted at N by the base structure, $H(N,l)$ is the memory required for a stride l hash table for paths from node N of T to nodes in $D_l(N)$, and $D_l(N)$ are descendents in T that are at level l of the subtrie of T rooted at N.

18. The method according to claim 10, wherein the base structure is a multi-bit-trie (MBT) or a hybrid shape shifting trie (HSST).

19. The method according to claim 10, further comprising: recursively partitioning the router table of the router to form the data structure comprising the first-level partition of the trie including the auxiliary partition and the subtrie partition before stripping the first s bits from the destination address received by the router, wherein recursively partitioning the router table of the router comprises:
selecting the stride s for partitioning the trie T into subtries ST(N) rooted at a node N of T, each subtrie ST(N) rooted at a node $N \in D_S(R)$ defining a partition of the router table, where $D_S(R)$ are descendents in T that are at level s of the subtrie of T rooted at R, $0<s\leq T.height+1$, where T.height is a maximum level at which there is a descendent of R, and the auxiliary partition L(R) is defined by prefixes whose length is less than the stride s,
wherein selecting the stride s comprises computing:

$$C(N, N \cdot height, r) = \min\left\{B(N, N \cdot height, r), \min_{0<l\leq N \cdot height}\left\{H(N, l) + C(N, l-1, r-1) + \sum_{Q\in D_l(N)} C(Q, Q \cdot height, r-1)\right\}\right\}, r>0,$$

where $C(N,1,0)=\infty$, where $C(N, l, r)$ is the minimum memory required by a recursively partitioned representation of the subtrie defined by levels 0 through l of ST(N), where $1\leq l\leq N.height+1$, where N.height is the height of node N, and r is a maximum number of memory accesses, $B(N, l, r)$ is a minimum memory required to represent levels 0 through l of the subtrie of T rooted at N by the base structure, $H(N, l)$ is the memory required for a stride l hash table for paths from node N of T to nodes in $D_l(N)$, and $D_l(N)$ are descendents in T that are at level l of the subtrie of T rooted at N.

* * * * *

UNITED STATES PATENT AND TRADEMARK OFFICE
CERTIFICATE OF CORRECTION

PATENT NO. : 7,990,979 B2  
APPLICATION NO. : 12/377032  
DATED : August 2, 2011  
INVENTOR(S) : Wencheng Lu and Sartaj Kumar Sahni Page 1 of 1

It is certified that error appears in the above-identified patent and that said Letters Patent is hereby corrected as shown below:

Column 1,  
Lines 33-34, "in the form addresses" should read --in the form of addresses--.

Column 2,  
Line 39, "table, that" should read --table that--.

Column 4,  
Line 30, "by DAR)," should read --by $D_s(R)$,--.

Column 5,  
Line 55, "through/of" should read --through l of--.
Line 66, "When/is" should read --when l is--.

Column 9,  
Line 38, "reduction is memory" should read --reduction in memory--.
Line 39, "deviation as 3%" should read --deviation was 3%--.

Signed and Sealed this  
Eighteenth Day of October, 2011

David J. Kappos  
*Director of the United States Patent and Trademark Office*